United States Patent
Bhogal et al.

(10) Patent No.: US 8,880,671 B2
(45) Date of Patent: Nov. 4, 2014

(54) RELEASING COMPUTING INFRASTRUCTURE COMPONENTS IN A NETWORKED COMPUTING ENVIRONMENT

(75) Inventors: Kulvir S. Bhogal, Pfugerville, TX (US); Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/295,656

(22) Filed: Nov. 14, 2011

(65) Prior Publication Data

US 2013/0124704 A1 May 16, 2013

(51) Int. Cl.
*G06F 15/173* (2006.01)
*G06F 9/50* (2006.01)

(52) U.S. Cl.
CPC .................................. *G06F 9/5072* (2013.01)
USPC ............................. 709/223; 709/224; 709/200

(58) Field of Classification Search
CPC ...................................................... G06F 15/16
USPC ................................................. 709/223, 224
See application file for complete search history.

(56) References Cited

U.S. PATENT DOCUMENTS

| | | | |
|---|---|---|---|
| 7,996,525 B2 | 8/2011 | Stienhans et al. | |
| 8,260,931 B2 * | 9/2012 | Balasubramanian et al. | 709/226 |
| 8,615,584 B2 * | 12/2013 | Dawson et al. | 709/226 |
| 2008/0080396 A1 | 4/2008 | Meijer et al. | |
| 2010/0153482 A1 | 6/2010 | Kim et al. | |
| 2010/0269119 A1 | 10/2010 | Arimilli et al. | |
| 2011/0138051 A1 * | 1/2011 | Okada et al. | 709/226 |
| 2011/0137805 A1 | 6/2011 | Brookbanks et al. | |
| 2011/0145094 A1 * | 6/2011 | Dawson et al. | 705/26.63 |
| 2011/0145413 A1 | 6/2011 | Dawson et al. | |
| 2011/0185064 A1 * | 7/2011 | Head et al. | 709/226 |
| 2011/0270968 A1 * | 11/2011 | Salsburg et al. | 709/224 |
| 2012/0066395 A1 * | 3/2012 | Ellis et al. | 709/226 |
| 2012/0131174 A1 * | 5/2012 | Ferris et al. | 709/224 |
| 2012/0185598 A1 * | 7/2012 | Ellis et al. | 709/226 |
| 2012/0226521 A1 * | 9/2012 | Bosworth et al. | 705/7.32 |
| 2012/0304179 A1 * | 11/2012 | Devarakonda et al. | 718/102 |
| 2012/0304191 A1 * | 11/2012 | Morgan | 718/105 |

(Continued)

FOREIGN PATENT DOCUMENTS

WO  WO 2011143568 A2 * 11/2011

OTHER PUBLICATIONS

Alvarez et al., "An Automated Approach to Cloud Storage Service Selection", ACM, Science Cloud' 11, Jun. 8, 2011, pp. 39-48.*

(Continued)

*Primary Examiner* — Anthony Mejia
(74) *Attorney, Agent, or Firm* — William E. Schiesser; Keohane & D'Alessandro, PLLC

(57) ABSTRACT

Embodiments of the present invention relate to the release of computing infrastructure components (e.g., hardware, software, combinations thereof, etc.) from a networked computing environment for potential use by another networked computing environment. In a typical embodiment, a computing infrastructure component is identified from set of computing infrastructure components associated with a networked computing environment. It may then be determined whether the computing infrastructure component can be released from the networked computing environment. Then, responsive to the determination, the computing infrastructure component may be released from the networked computing environment.

22 Claims, 10 Drawing Sheets

(56) References Cited

U.S. PATENT DOCUMENTS

| | | | |
|---|---|---|---|
| 2013/0031028 A1* | 1/2013 | Martin | 705/400 |
| 2013/0060933 A1* | 3/2013 | Tung et al. | 709/224 |
| 2013/0104136 A1* | 4/2013 | Brech et al. | 718/102 |
| 2013/0111032 A1* | 5/2013 | Alapati et al. | 709/226 |
| 2013/0159150 A1* | 6/2013 | Hao et al. | 705/30 |

OTHER PUBLICATIONS

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

* cited by examiner

RELEASING COMPUTING INFRASTRUCTURE COMPONENTS IN A NETWORKED COMPUTING ENVIRONMENT

TECHNICAL FIELD

Embodiments of the present invention relate to the release of computing infrastructure components. Specifically, embodiments of the present invention relate to the release of computing infrastructure components from a first networked computing environment (e.g., a dynamic cloud environment) for potential use by a second networked computing environment (e.g., a static cloud environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud computing environments generally provide "web-based processing," whereby shared resources, software, and information are provided to computers and other devices over the Internet (e.g., on-demand). Typical cloud computing providers deliver common business applications online that are accessed from another Web service or software like a Web browser, while the software and data are stored on servers. Challenges may exist, however, in providing methods to determine whether and/or when to release computing infrastructure components from a cloud environment (e.g., a dynamic cloud environment).

SUMMARY

Embodiments of the present invention relate to the release of computing infrastructure components (e.g., hardware, software, combinations thereof, etc.) from a networked computing environment (e.g., a dynamic cloud environment) for potential use by another networked computing environment (e.g., a static cloud environment). In a typical embodiment, a computing infrastructure component is identified from a set of computing infrastructure components associated with a networked computing environment. It may then be determined whether the computing infrastructure component can be released from the networked computing environment. This determination may be made based upon multiple factors such as: a period of non-use of the computing infrastructure component, a reservation associated with the computing infrastructure component, a forecasted need for the computing infrastructure component, a market condition (e.g., supply vs. demand) associated with the computing infrastructure component, and/or a cost associated with the computing infrastructure component. Then, responsive to the determination, the computing infrastructure component may be released from the networked computing environment and made available by another networked computing environment.

A first aspect of the present invention provides a computer-implemented method for releasing computing infrastructure components in a networked computing environment, comprising: identifying a computing infrastructure component among a set of computing infrastructure components associated with the networked computing environment; determining whether the computing infrastructure component can be released from the networked computing environment, the determining being based upon at least one of the following: a period of non-use of the computing infrastructure component, a reservation associated with the computing infrastructure component, a forecasted need for the computing infrastructure component, a market condition associated with the computing infrastructure component, and a cost associated with the computing infrastructure component; and responsive to the determining, releasing the computing infrastructure component from the networked computing environment.

A second aspect of the present invention provides a system for releasing computing infrastructure components in a networked computing environment, comprising: a memory medium comprising instructions; a bus coupled to the memory medium; and a processor coupled to the bus that when executing the instructions causes the system to: identify a computing infrastructure component among a set of computing infrastructure components associated with the networked computing environment; determine whether the computing infrastructure component can be released from the networked computing environment, the determining being based upon at least one of the following: a period of non-use of the computing infrastructure component, a reservation associated with the computing infrastructure component, a forecasted need for the computing infrastructure component, a market condition associated with the computing infrastructure component, and a cost associated with the computing infrastructure component; and responsive to the determining, release the computing infrastructure component from the networked computing environment.

A third aspect of the present invention provides a computer program product for releasing computing infrastructure components in a networked computing environment, the computer program product comprising a computer readable storage media, and program instructions stored on the computer readable storage media, to: identify a computing infrastructure component among a set of computing infrastructure components associated with the networked computing environment; determine whether the computing infrastructure component can be released from the networked computing environment, the determining being based upon at least one of the following: a period of non-use of the computing infrastructure component, a reservation associated with the computing infrastructure component, a forecasted need for the computing infrastructure component, a market condition associated with the computing infrastructure component, and a cost associated with the computing infrastructure component; and responsive to the determining, release the computing infrastructure component from the networked computing environment.

A fourth aspect of the present invention provides a method for deploying a system for releasing computing infrastructure components in a networked computing environment, comprising: providing a computer infrastructure being operable to: identify a computing infrastructure component among a set of computing infrastructure components associated with the networked computing environment; determine whether the computing infrastructure component can be released from the networked computing environment, the determining being based upon at least one of the following: a period of non-use of the computing infrastructure component, a reservation associated with the computing infrastructure component, a forecasted need for the computing infrastructure component, a market condition associated with the computing infrastructure component, and a cost associated with the computing infrastructure component; and responsive to the determining, release the computing infrastructure component from the networked computing environment.

BRIEF DESCRIPTION OF THE DRAWINGS

These and other features of this invention will be more readily understood from the following detailed description of the various aspects of the invention taken in conjunction with the accompanying drawings in which.

Figure 1:
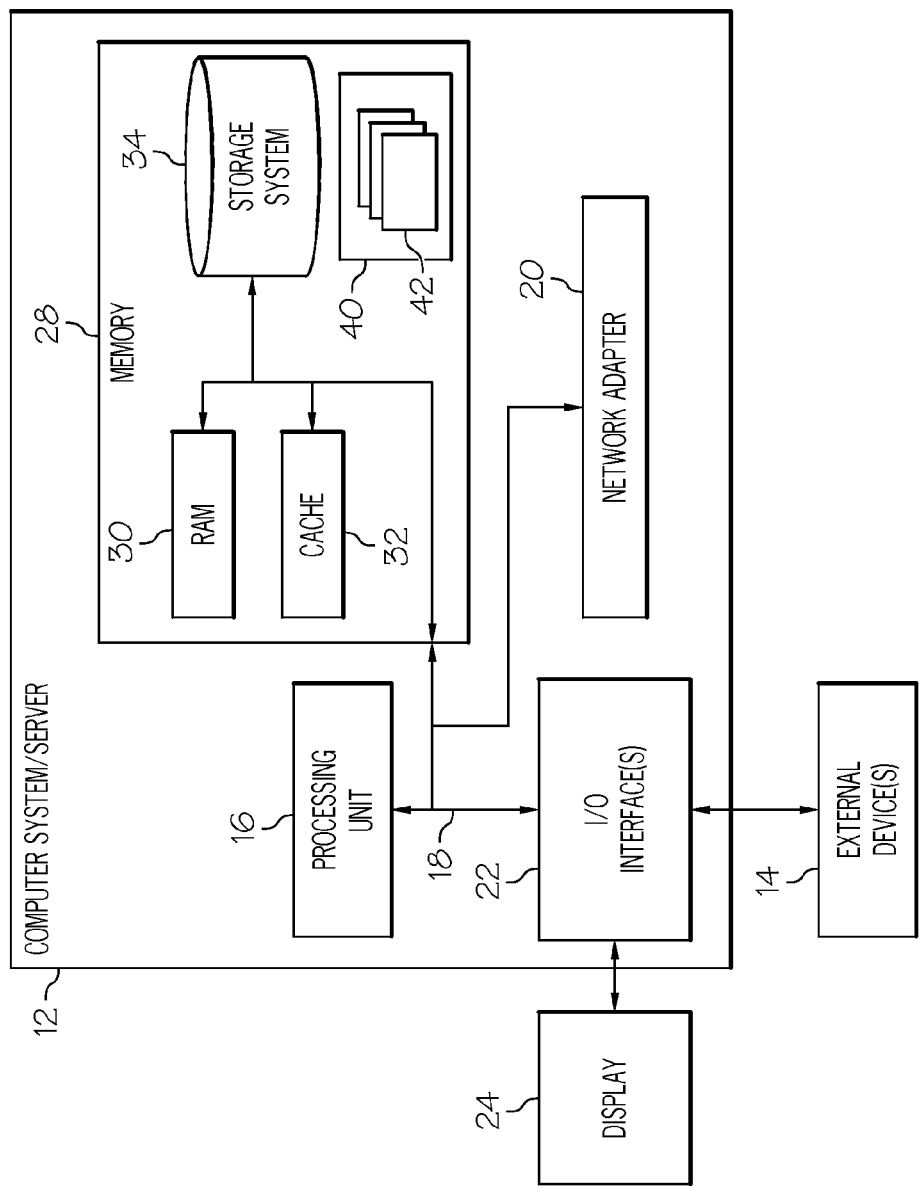
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to the release of computing infrastructure components (e.g., hardware, software, combinations thereof, etc.) from a networked computing environment (e.g., a dynamic cloud environment) for potential use by another networked computing environment (e.g., a static cloud environment). In a typical embodiment, a computing infrastructure component is identified from a set of computing infrastructure components associated with a networked computing environment. It may then be determined whether the computing infrastructure component can be released from the networked computing environment. This determination may be made based upon multiple factors such as: a period of non-use of the computing infrastructure component, a reservation associated with the computing infrastructure component, a forecasted need for the computing infrastructure component, a market condition (e.g., supply quantity vs. demand quantity) associated with the computing infrastructure component, and/or a cost associated with the computing infrastructure component. Then, responsive to the determination, the computing infrastructure component may be released from the networked computing environment and made available by another networked computing environment.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
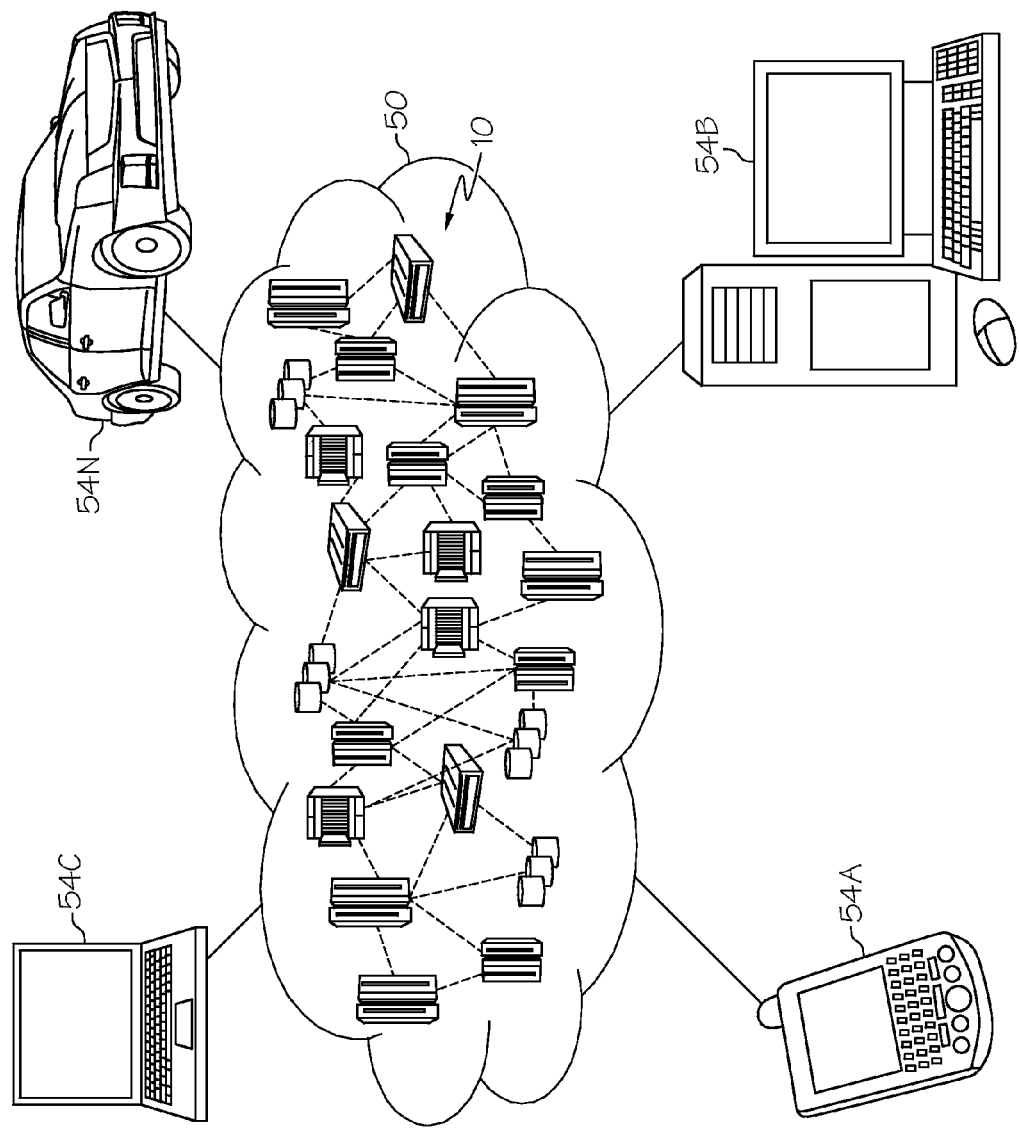
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
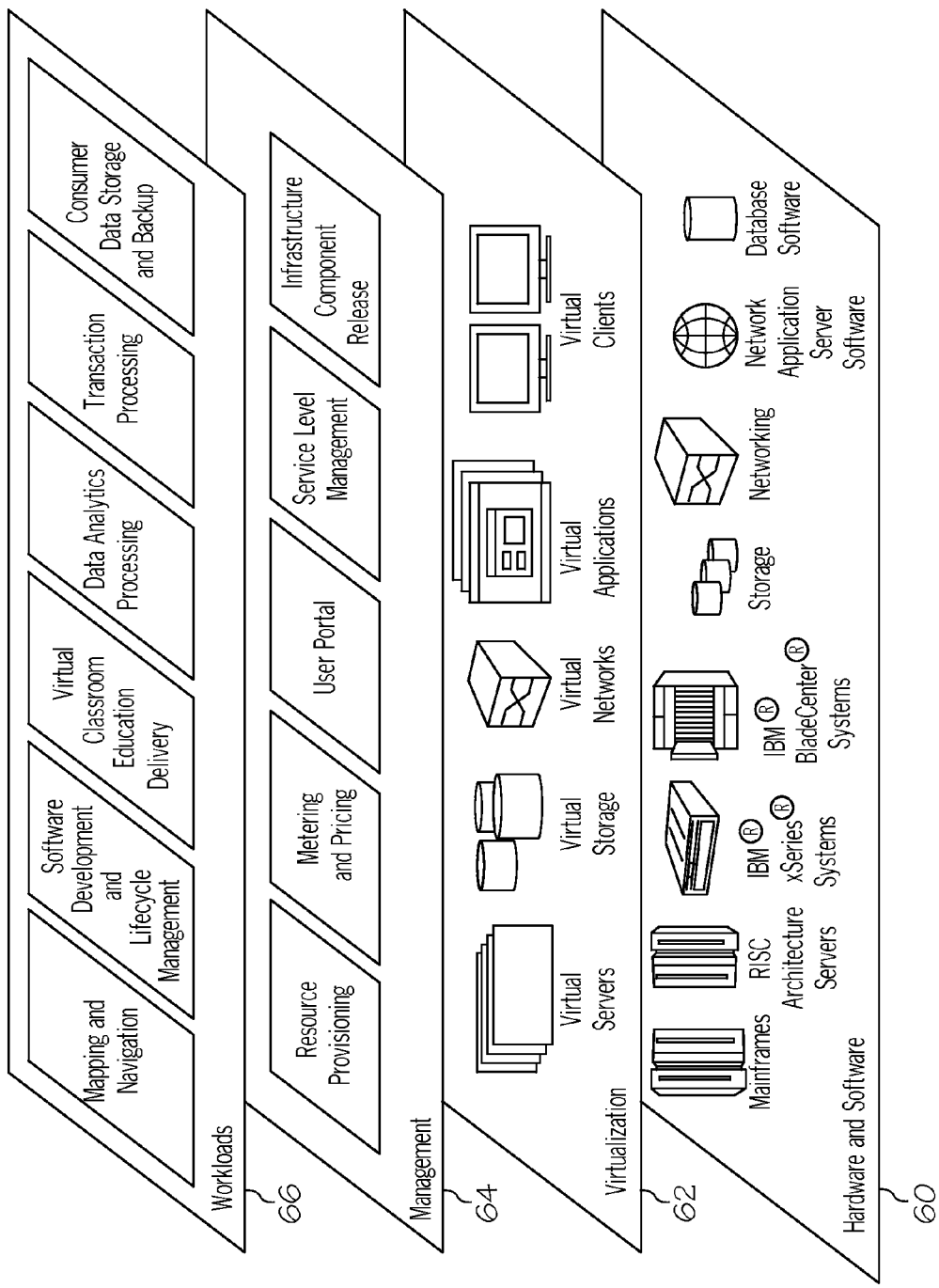
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing infrastructure component release, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing infrastructure component release functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
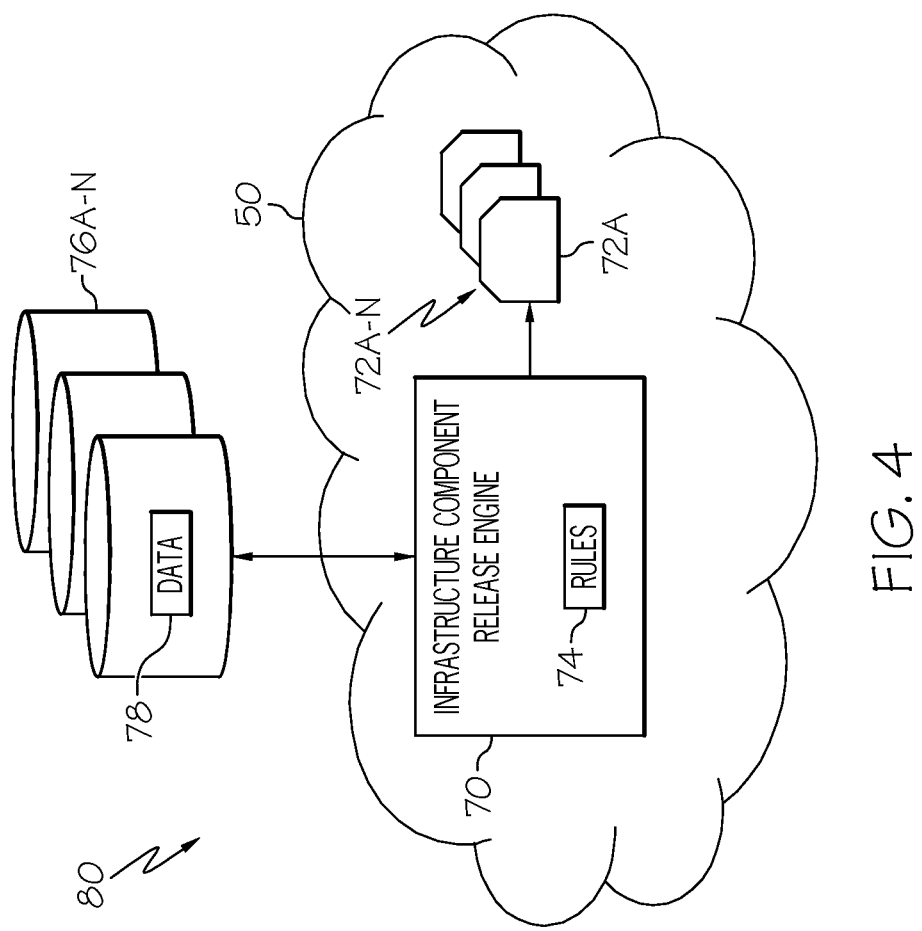
FIG. 4 depicts a system diagram according to an embodiment of the present invention.

Referring now to FIG. 4, a system diagram according to an embodiment of the present invention is shown. As depicted in FIG. 4, computing infrastructure component release engine (engine 70) is shown within computer system/server 12. In general, engine 70 can be implemented as program 40 on computer system 12 of FIG. 1 and can implement the functions recited herein. As further shown, engine 70 (in one embodiment) comprises a rules and/or computational engine that processes a set (at least one) of rules/logic 74 and/or performs computations to provide release of computing infrastructure components (e.g., hardware, software, or a combination thereof) hereunder.

Along these lines, engine 70 may perform multiple functions similar to a general-purpose computer using rules/logic 74 and/or data 78 stored in one or more computer storage devices 76A-N. Specifically, among other functions, engine 70 may (among other things): identify a computing infrastructure component 72A among a set of computing infrastructure components 72A-N associated with (e.g., dynamic) networked computing environment 80 (e.g., comprising a cloud computing environment 50); determine whether the computing infrastructure component 72A can be released from the networked computing environment 80; make such a determination based upon at least one of the following (criteria): a period of non-use of the computing infrastructure component (as compared to a predetermined threshold), a reservation associated with the computing infrastructure component, a forecasted need for the computing infrastructure component, a market condition associated with the computing infrastructure component, and a cost associated with the computing infrastructure component; responsive to the determination, release the computing infrastructure component 72A from the networked computing environment 80; detect a release of the computing infrastructure component 72A; and/or make the computing infrastructure component 72A available to another networked computing environment (e.g., another dynamic networked computing environment and/or a static networked computing environment).

As described above, embodiments of the present invention provide multiple approaches for determining whether computing infrastructure component 72A may be released by networked computing environment 80. Shown below are some illustrative examples of approaches that can be implemented hereunder.

Unused Component Approach

This approach typically entails making a determination to release computing infrastructure component 72A after the component in question has been unused for some period of time (e.g., a predetermined threshold. Such periods of non-use could vary hereunder, and reflect a cloud provider's acquisition and release strategy. For example, a cloud provider may determine that hardware unused for some number of seconds, or even conceivably sub-seconds, could be released. Such highly granular releases may become cost effective in the event that the computing infrastructure component in question is very small (e.g., individual or fractional processors being considered under embodiments of the invention). Conversely, the component 72A could be released after some period extending up to days or weeks. Such approaches may make sense when the cost of maintaining infrastructure in the dynamic cloud is relatively low, and low market demand exists to place the component into alternative, profitable uses.

Figure 5:
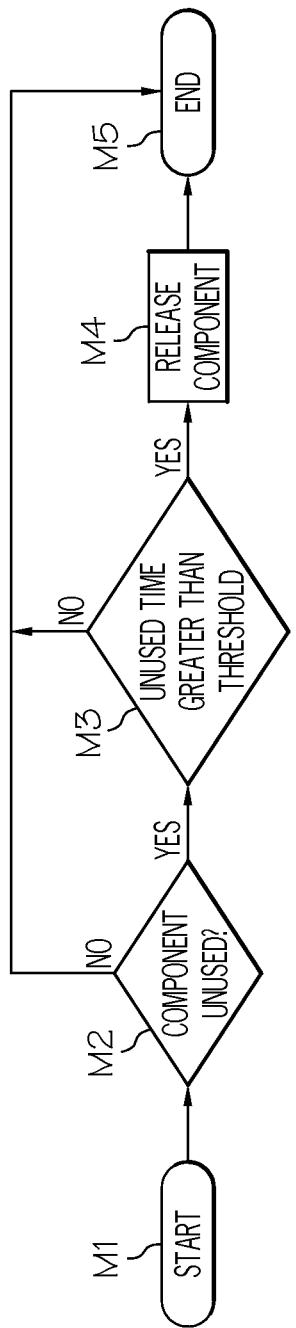
FIG. 5 depicts a method flow diagram according to an embodiment of the present invention.

Referring now to FIG. 5, a method flow diagram of this approach is shown. As depicted, the process starts in step M1. In step M2, it is determined whether an infrastructure component is unused. If not, the process can end in step M5. If a component was un-used, it will be determined in step M3 whether the component was unused for a period of time greater than a predetermined threshold. If not, the process ends in step M5. However, if the component was unused for a period of time greater than the threshold, the component will be released in step M4 before the process is ended in step M5.

Reservation-Based Component Release Approach

Under one embodiment, infrastructure components may be reserved at the beginning at some period of time. Examples of such reservations might include: requests for transactional systems to accommodate events (e.g., sporting) or other entertainment, requests for computational power to assist in nightly or month-end "batch jobs," or other such customer requests. In this event, a cloud provider may recognize that components are currently unused, and the provider might then examine future reservations and requests. The considered computing infrastructure components may only be released if no "immediate" needs may be satisfied by the infrastructure. It is noted that "immediate" can be likewise defined in a variety of ways, but that components would generally be released if a cloud provider determines that this or similar infrastructure could be reacquired before the customer's reservation needs to be met. Similar to the above example, such periods may run from the sub-second through days or weeks, and are generally seen as a function of component liquidity (e.g., how easily such components may be reacquired when the need arises).

Figure 6:
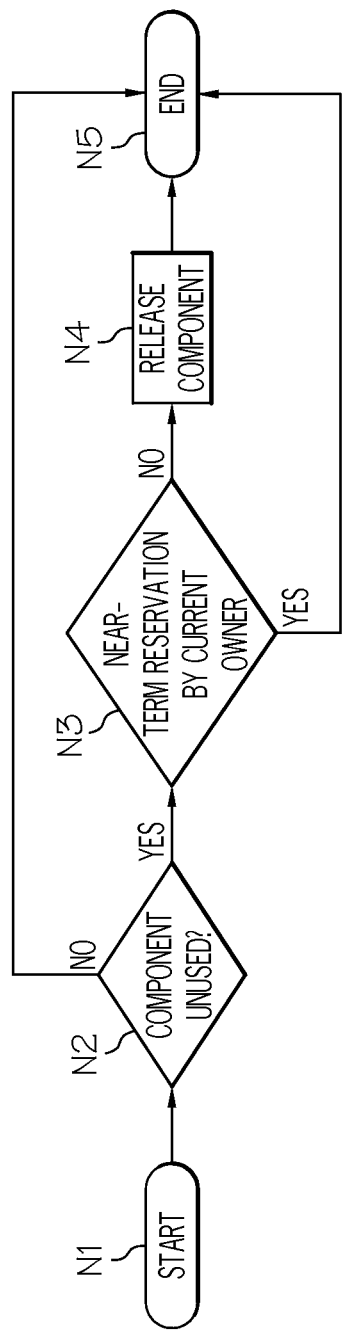
FIG. 6 depicts another method flow diagram according to an embodiment of the present invention.

Referring now to FIG. 6, a method flow diagram of this approach is shown. As depicted, the process starts in step N1. In step N2, it is determined whether an infrastructure component is unused. If not, the process can end in step N5. If a component was un-used, it will be determined in step N3 whether a near-term reservation by a current owner exists. If not, the process ends in step N5. However, if a near-term reservation by a current owner does exist, the component will be released in step N4 before the process is ended in step N5.

Predictive/Forecasted Component Release Approach

Over time, dynamic cloud providers may learn when to expect peaks or valleys in demand for services. Such deviations may be forecasted, independent of customer reservations, and may hinge on such factors as time of day, day of week, time of month, time of quarter, or time of year. Providers may also discern variations based on localized or globalized events such as elections, sports or entertainment events, etc., again, independent of any customer reservations. In this event, the cloud provider may recognize that components are currently unused, and the provider may then examine future demands based on such past empirical evidence. The considered computing infrastructure components will only be released if no "immediate" needs could be satisfied by the infrastructure. It is noted that "immediate" can be likewise defined in a variety of ways, but that components would generally be released if the cloud provider feels that this or similar infrastructure could be reacquired before the customer reservation needs to be met. Similar to the above example, such periods could conceivably run from the sub-second through days or weeks, and are generally seen as a function of component liquidity (e.g., how easy it is to reacquire such components when the need arises).

Figure 7:
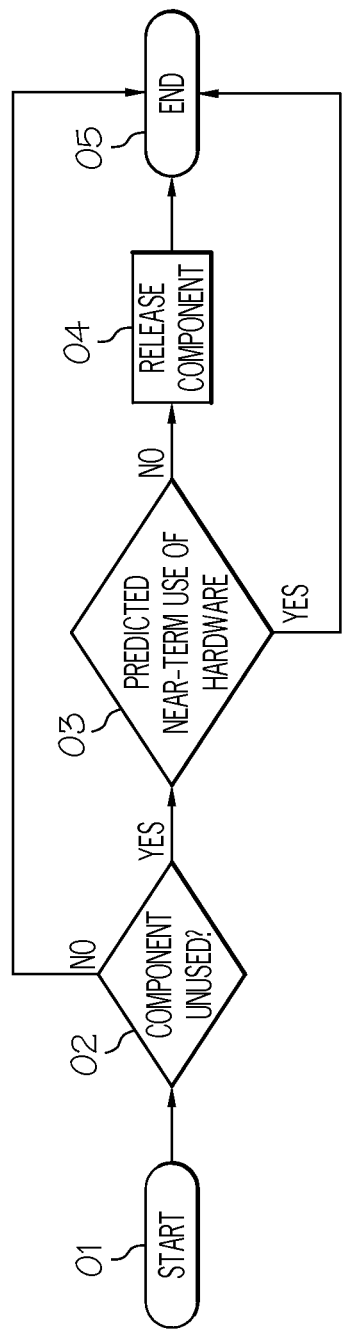
FIG. 7 depicts another method flow diagram according to an embodiment of the present invention.

Referring now to FIG. 7, a method flow diagram of this approach is shown. As depicted, the process starts in step O1. In step O2, it is determined whether an infrastructure component is unused. If not, the process can end in step O5. If a component was un-used, it will be determined in step O3 whether a near-term use of the component is predicted/forecasted. If not, the process ends in step O5. However, if a near-term use of the component is forecasted, the component will be released in step O4 before the process is ended in step O5.

Market Condition Component Release Approach

When a cloud service provider has infrastructure which is either unused or lightly used, certain cases may exist when market demands could offer higher economic benefit than its current usage. Cases may include those in which certain infrastructure is in high demand, and external parties may offer greater remuneration than can be gained by continuing to hold the existing infrastructure. In this case, two variations may be considered, that where customer goodwill and service level agreements are unconsidered and that in which they are considered. In the former case, certain additional financial considerations may be made before releasing the hardware (e.g. cost of breaking an SLA, or cost of losing future business if released hardware means that a customer's scheduled job will not be executed). In the latter case, a simple cost-benefit analysis can be conducted. In either case, infrastructure will be released and made available to consummate the higher value proposition. Provisions may be made where the release is only performed if the releasing cloud has assurance that another cloud will be able to pick up the released workload.

Figure 8:
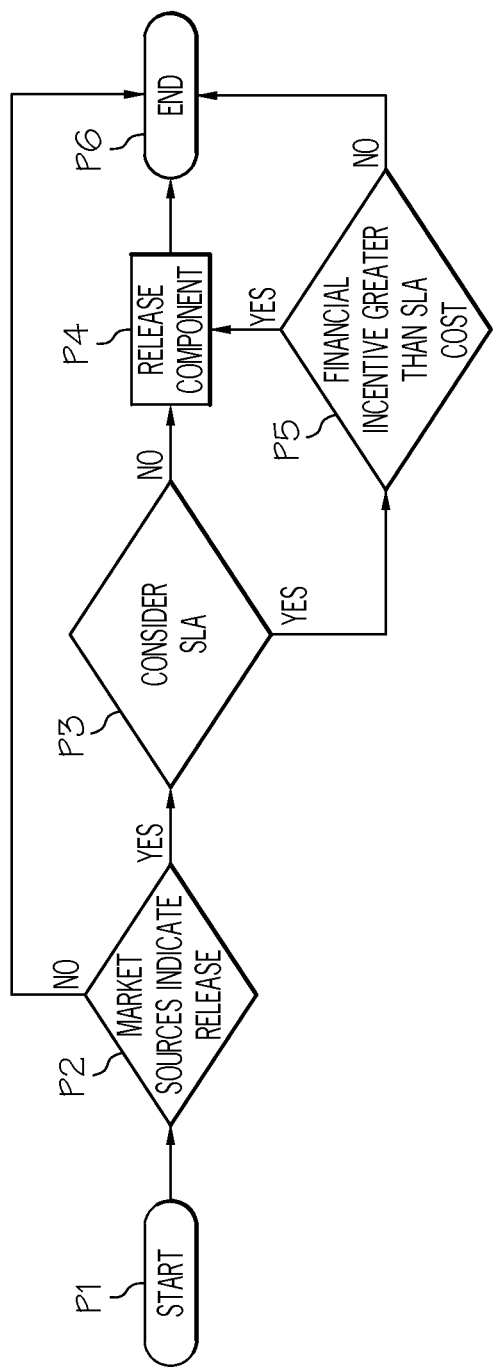
FIG. 8 depicts another method flow diagram according to an embodiment of the present invention.

Referring to FIG. 8, a method flow diagram of this approach is shown. The process is started in step P1 and in step P2, it is determined whether market forces/conditions indicate the release of a component. If not, the process ends in step P6. If so, it is determined whether a service level agreement (SLA) associated with the component should be considered in step P3. If not, the component can be released in step P4, before the process is ended in step P6. If, however, the SLA is to be considered, it will be determined in step P5 whether the financial incentive for releasing the component is greater than the cost of breaking the SLA. If so, the component is released in step P4 before the process is ended in step P6. If, however, the financial incentive is not greater than the SLA termination costs, the process will directly end in step P6.

Cost-Based Component Release Approach

In the absence of external bids for computing infrastructure components, cloud service providers may decide to release components based upon low revenue deals, vis-a-vis the maintenance costs associated with such hardware. Such maintenance costs may be the rate (by time) charged for use of the components, or it could involve more traditional cost models, including power, cooling, and/or maintenance staff. Again, even in the absence of competition for the components, if current or projected revenue from the use of the hardware is less than the associated costs, then the cloud provider may opt to release. In this case, two variations may be considered, that where customer goodwill and service level agreements are unconsidered and that in which they are considered. In the former case, certain additional financial considerations may be made before releasing the hardware (e.g., the cost of breaking an SLA, or the cost of losing future business if released hardware means that a customer's scheduled job will not be executed. In the latter case, a simple cost-benefit analysis can be conducted. In either case, infrastructure will be released and cost savings realized through discontinuing use of the cost-incurring infrastructure. In one embodiment, a cloud service provider may 'sub' a job it planned on originally performing to another cloud which has capacity and can perform the job less expensively while maintaining SLAs. The cloud service provider can then use its released capacity to handle another job. The cloud service provider can profit from its sub-contracted job after deducting the costs therewith.

Figure 9:
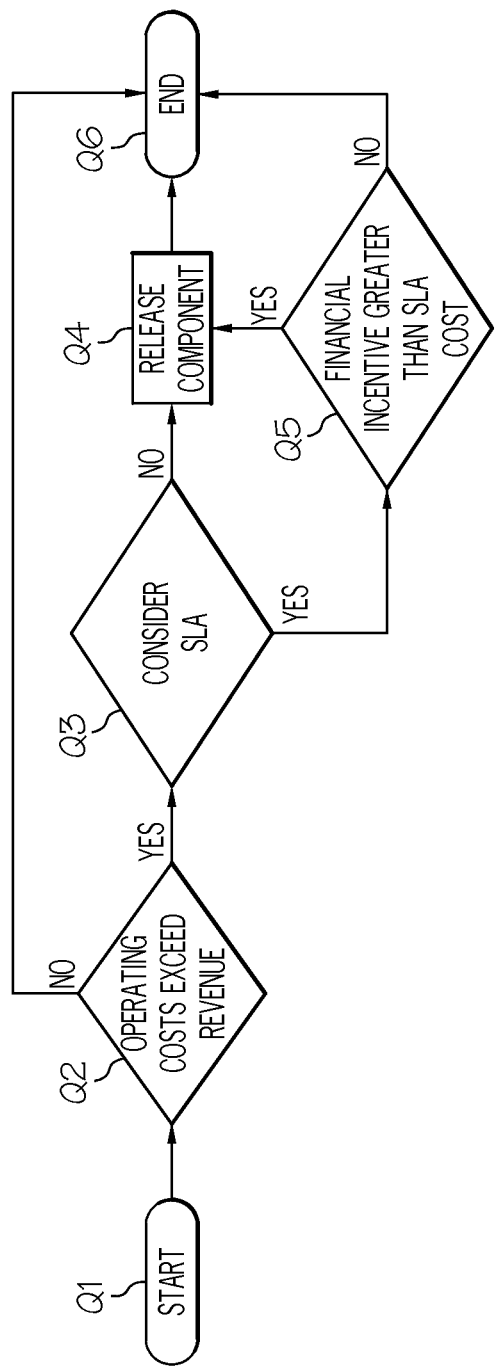
FIG. 9 depicts another method flow diagram according to an embodiment of the present invention.

Referring to FIG. 9, a method flow diagram of this approach is shown. The process is started in step Q1 and in step Q2, it is determined whether operating costs for operating the component exceeds the revenue generated therefrom. If not, the process ends in step Q6. If so, it is determined whether the service level agreement associated with the component should be considered in step Q3. If not, the component can be released in step Q4, before the process is ended in step Q6. If, however, the SLA is to be considered, it will be determined whether the financial incentive for releasing the component is greater than the cost of breaking the SLA in step Q5. If so, the component is released in step Q4 before the process is ended in step Q6. If, however, the financial incentive is not greater than the SLA termination costs, the process will directly end in step Q6.

Hardware Release Detection

Under certain circumstances, it may be beneficial if computing infrastructure components are released for other uses. Such releases may occur directly to individual static cloud providers, or infrastructure may be transferred to other dynamic clouds or for stand-alone operations. Multiple approaches may exist for this purpose.

A. Resource Over-Allocation

In this approach, the number of allocated resources exceeds the present requirement. This may occur because a client has requested their allocations released, or the total number of present allocations has declined to a threshold where it may be beneficial to consolidate resources to fewer cloud providers, internal or external.

B. Price Driven De-Allocation

This approach is driven by market dynamics in which individual cloud providers may provide price breaks if the proposed inventive series releases a specified number of allocations on a cloud. For example, consider a scenario in which the negotiated rate between a cloud provider and this proposed invention is $1 per computing hour and the applicable system has 50 allocations on the cloud. Now consider an external or internal pressure on the cloud provider. An external pressure may be that outside customers are coming directly to the cloud provider and willing to pay $2 per hour. An internal pressure may be large hardware failure that prevents the cloud provider from meeting their SLA with various customers. In such a scenario, the cloud provider may automatically communicate to the proposed invention that if the provider were to reduce their allocation from 50 to 25 allocations, the cloud provider would reduce the billing rate to 50 cents per hour. At this point, the proposed invention may reduce the number of allocations on this particular provider by moving allocations to other providers.

Release Mechanics

In this approach, consumers may release resources for cloud providers, invoking those de-allocation methods to release the hardware on a specific cloud provider. Prior to de-allocation the proposed invention may suspend live instances and migrate them to other cloud providers. Again, the nature of dynamic cloud foundations requires that infrastructure be searchable, acquirable, and releasable. The techniques described here permit the release of such infrastructure, and may be expanded with various granular embodiments as warranted.

Figure 10:
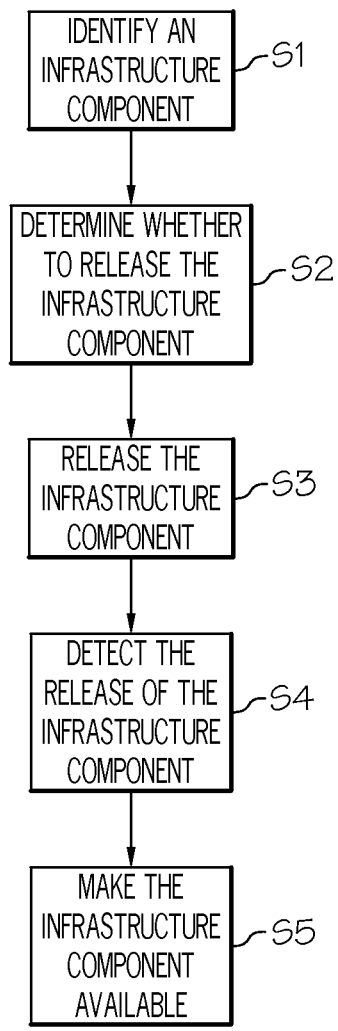
FIG. 10 depicts another method flow diagram according to an embodiment of the present invention.

Referring now to FIG. 10, a method flow diagram according to an embodiment of the present invention is shown. As depicted in step S1, an infrastructure component is identified. In step S2, it is determined whether to release the infrastructure component (e.g., using the approaches set forth above). In step S3, the infrastructure component is released. In step S4, the release of the infrastructure component is detected, and in step S5, the infrastructure component is made available to other networked computing environments.

While shown and described herein as a computing infrastructure component release solution, it is understood that the invention further provides various alternative embodiments. For example, in one embodiment, the invention provides a computer-readable/useable medium that includes computer program code to enable a computer infrastructure to provide computing infrastructure component release functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing infrastructure component release functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing infrastructure component release. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for releasing computing infrastructure components in a networked computing environment, comprising:
   identifying, via at least one computing device, a computing infrastructure component among a set of computing infrastructure components associated with the networked computing environment, the computer infrastructure component being allocated to a workload for processing by a first cloud provider at a first price;
   receiving, at the first cloud provider via the at least one computing device, a request from a second cloud provider to process another workload at a second price, the second price being higher than the first price;
   receiving, via the at least one computing device, a communication from the first cloud provider that if at least a portion of the workload is transferred from the computer infrastructure component to another computer infrastructure component that the workload will be processed at a third price lower than the first price;
   determining, via the at least one computing device, whether the computing infrastructure component can be released from the networked computing environment, the determining being based upon at least one of the following: a period of non-use of the computing infrastructure component, a reservation associated with the computing infrastructure component, a market condition associated with the computing infrastructure component, and a cost associated with the computing infrastructure component;
   evaluating, via the at least one computing device, whether the another computer infrastructure component is available to process the workload from the computer infrastructure component; and
   responsive to the determining and evaluating,
      transferring, via the at least one computing device, the workload from the computer infrastructure component to the other computer infrastructure component, and
      releasing, via the at least one computing device, the computing infrastructure component from the networked computing environment.

2. The computer-implemented method of claim 1, the networked computing environment comprising a dynamic cloud computing environment.

3. The computer-implemented method of claim 1, further comprising, responsive to the releasing, making, via the at least one computing device, the computing infrastructure component available to another networked computing environment.

4. The computer-implemented method of claim 1, the determining being based on a service level agreement (SLA) associated with the computing infrastructure component.

5. The computer-implemented method of claim 1, the determining comprising comparing, via the at least one computing device, the period of non-use of the computing infrastructure component to a predetermined threshold.

6. The computer-implemented method of claim 1, the market condition comprising a supply quantity versus a demand quantity associated with the computing infrastructure component.

7. The computer-implemented method of claim 1, further comprising, responsive to the releasing, detecting, via the at least one computing device, a release of the computing infrastructure component.

8. A system for releasing computing infrastructure components in a networked computing environment, comprising:
    a memory medium comprising instructions;
    a bus coupled to the memory medium; and
    a processor coupled to the bus that when executing the instructions causes the system to:
        identify a computing infrastructure component among a set of computing infrastructure components associated with the networked computing environment, the computer infrastructure component being allocated to a workload for processing by a first cloud provider at a first price;
        receive, at the first cloud provider, a request from a second cloud provider to process another workload at a second price, the second price being higher than the first price;
        receive a communication from the first cloud provider that if at least a portion of the workload is transferred from the computer infrastructure component to another computer infrastructure component that the workload will be processed at a third price lower than the first price;
        determine whether the computing infrastructure component can be released from the networked computing environment, the determining being based upon at least one of the following: a period of non-use of the computing infrastructure component, a reservation associated with the computing infrastructure component, a market condition associated with the computing infrastructure component, and a cost associated with the computing infrastructure component;
        evaluate whether the another computer infrastructure component is available to process the workload from the computer infrastructure component; and
        responsive to the determining and evaluating,
            transfer the workload from the computer infrastructure component to the other computer infrastructure component, and
            release the computing infrastructure component from the networked computing environment.

9. The system of claim 8, the networked computing environment comprising a dynamic cloud computing environment.

10. The system of claim 8, the memory medium further comprising instructions for causing the system to, responsive to the release, make the computing infrastructure component available to another networked computing environment.

11. The system of claim 8, the determination being based on a service level agreement (SLA) associated with the computing infrastructure component.

12. The system of claim 8, the determination comprising comparing the period of non-use of the computing infrastructure component to a predetermined threshold.

13. The system of claim 8, the market condition comprising a supply quantity versus a demand quantity associated with the computing infrastructure component.

14. The system of claim 8, the memory medium further comprising instructions for causing the system to, responsive to the release, detect a release of the computing infrastructure component.

15. A computer program product for releasing computing infrastructure components in a networked computing environment, the computer program product comprising a computer readable storage device, and program instructions stored on the computer readable storage device, to:
    identify a computing infrastructure component among a set of computing infrastructure components associated with the networked computing environment, the computer infrastructure component being allocated to a workload for processing by a first cloud provider at a first price;
    receive, at the first cloud provider, a request from a second cloud provider to process another workload at a second price, the second price being higher than the first price;
    receive a communication from the first cloud provider that if at least a portion of the workload is transferred from the computer infrastructure component to another computer infrastructure component that the workload will be processed at a third price lower than the first price;
    determine whether the computing infrastructure component can be released from the networked computing environment, the determining being based upon at least one of the following: a period of non-use of the computing infrastructure component, a reservation associated with the computing infrastructure component, a market condition associated with the computing infrastructure component, and a cost associated with the computing infrastructure component;
    evaluate whether the another computer infrastructure component is available to process the workload from the computer infrastructure component; and
    responsive to the determining and evaluating,
        transfer the workload from the computer infrastructure component to the other computer infrastructure component, and
        release the computing infrastructure component from the networked computing environment.

16. The computer program product of claim 15, the networked computing environment comprising a dynamic cloud computing environment.

17. The computer program product of claim 15, the computer readable storage device further comprising instructions to, responsive to the release, make the computing infrastructure component available to another networked computing environment.

18. The computer program product of claim 15, the determination being based on a service level agreement (SLA) associated with the computing infrastructure component.

19. The computer program product of claim 15, the determination comprising comparing the period of non-use of the computing infrastructure component to a predetermined threshold.

20. The computer program product of claim 15, the market condition comprising a supply quantity versus a demand quantity associated with the computing infrastructure component.

21. The computer program product of claim 15, the computer readable storage device further comprising instructions to, responsive to the release, detect a release of the computing infrastructure component.

22. A method for deploying a system for releasing computing infrastructure components in a networked computing environment, comprising:
   providing a computer infrastructure being operable to:
      identify a computing infrastructure component among a set of computing infrastructure components associated with the networked computing environment, the computer infrastructure component being allocated to a workload for processing by a first cloud provider at a first price;
      receive, at the first cloud provider, a request from a second cloud provider to process another workload at a second price, the second price being higher than the first price;
      receive a communication from the first cloud provider that if at least a portion of the workload is transferred from the computer infrastructure component to another computer infrastructure component that the workload will be processed at a third price lower than the first price;
      determine whether the computing infrastructure component can be released from the networked computing environment, the determining being based upon at least one of the following: a period of non-use of the computing infrastructure component, a reservation associated with the computing infrastructure component, a market condition associated with the computing infrastructure component, and a cost associated with the computing infrastructure component;
      evaluate whether the another computer infrastructure component is available to process the workload from the computer infrastructure component; and
      responsive to the determining and evaluating,
         transfer the workload from the computer infrastructure component to the other computer infrastructure component, and
         release the computing infrastructure component from the networked computing environment;
      wherein the computer infrastructure comprises at least one computer.

* * * * *